United States Patent [19]

Defaucheux et al.

[11] Patent Number: 4,618,471

[45] Date of Patent: Oct. 21, 1986

[54] ELECTROMAGNETIC SAFETY DEVICE OF A SCREW/NUT TYPE

[75] Inventors: Jacques B. Defaucheux; Freddy Guedj, both of Jeumont, France

[73] Assignees: Jeumont-Schneider, Puteaux; Framatone, Courbevoil, both of France

[21] Appl. No.: 541,482

[22] Filed: Oct. 13, 1983

Related U.S. Application Data

[63] Continuation of Ser. No. 226,015, Jan. 19, 1981, abandoned.

[30] Foreign Application Priority Data

Jan. 24, 1980 [FR] France .................. 80 01515

[51] Int. Cl.$^4$ .................................. G21C 7/12
[52] U.S. Cl. ................................ 376/228; 376/232; 376/233; 294/906; 294/86.29
[58] Field of Search .............. 376/228, 232, 233; 294/86 A, 95, 88, 86.28, 86.29, 86.33

[56] References Cited

U.S. PATENT DOCUMENTS

| | | | |
|---|---|---|---|
| 1,635,622 | 7/1927 | Henderson | 294/86.29 |
| 2,841,026 | 7/1958 | Glass | 376/228 |
| 3,388,942 | 6/1968 | Johnsson et al. | 376/264 |
| 3,486,095 | 12/1969 | Sherwood et al. | 376/228 |

FOREIGN PATENT DOCUMENTS

| | | | |
|---|---|---|---|
| 1290265 | 3/1969 | Fed. Rep. of Germany | 376/232 |
| 2115486 | 10/1972 | Fed. Rep. of Germany | . |
| 1241783 | 4/1960 | France | . |
| 1450728 | 7/1966 | France | . |
| 2041170 | 1/1971 | France | . |
| 2075928 | 10/1971 | France | . |
| 2320656 | 3/1977 | France | . |
| 2407553 | 5/1979 | France | 02001980/FRX |
| 0068697 | 6/1977 | Japan | 376/233 |
| 927522 | 5/1963 | United Kingdom | 376/232 |

*Primary Examiner*—Harvey E. Behrend
*Attorney, Agent, or Firm*—Rines and Rines, Shapiro and Shapiro

[57] ABSTRACT

A safety device to be applied to the vertical displacement of, for example, the control rods of a nuclear reactor, comprises the combination of a stator placed on the outside upper part of an impervious, nonmagnetic cylinder within the inside of which a rotor is mounted about its shaft, free in axial translation, with the shaft rotatable with the rotor but fixed in translation, and with the rotation of the shaft transferred to a hollow threaded rod which will transfer rotation to a nut slidable vertically inside the cylinder, supporting the control rods therebelow; the rotor also controlling the opening and closing of a jaw for holding and releasing the hollow threaded rod.

11 Claims, 5 Drawing Figures

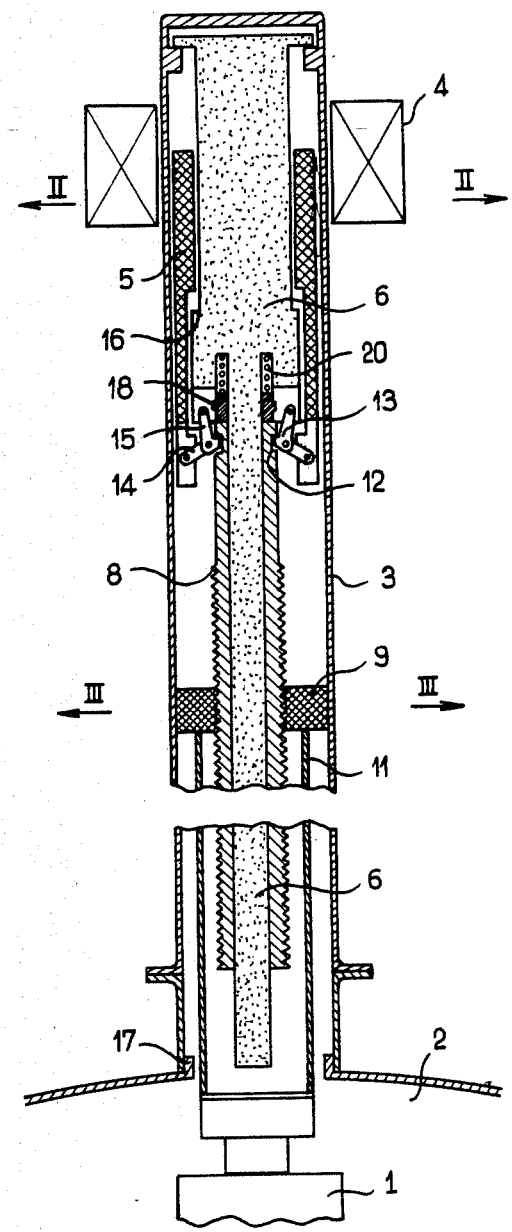
FIG_1
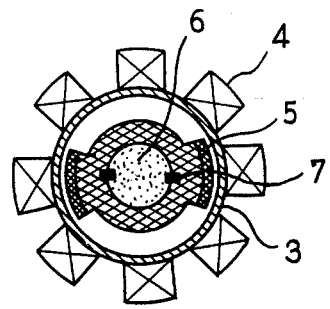
FIG_2
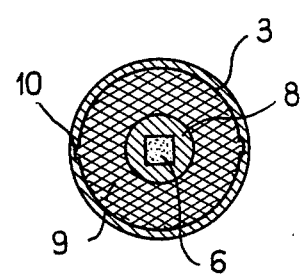
FIG_3

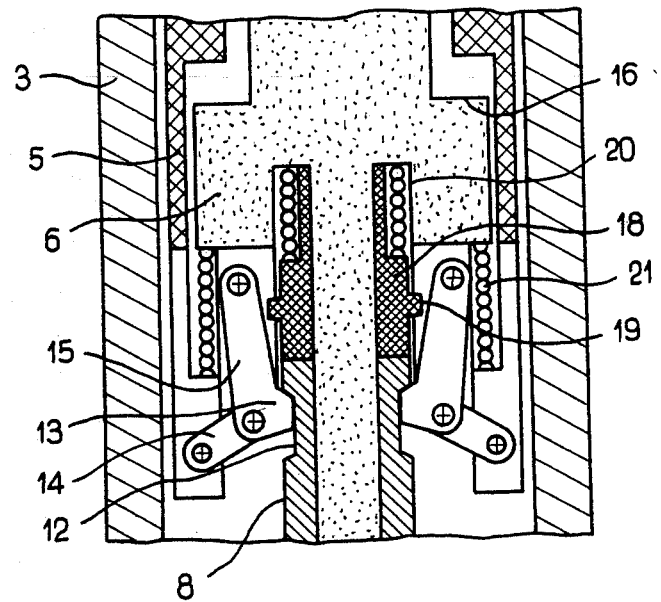
FIG_4
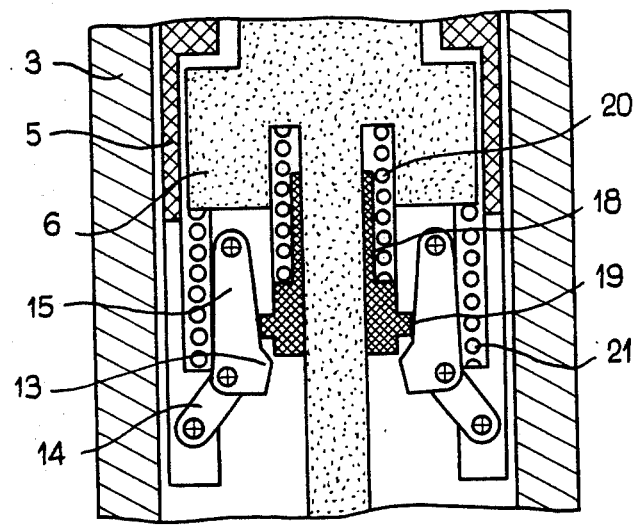
FIG_5

ELECTROMAGNETIC SAFETY DEVICE OF A SCREW/NUT TYPE

This application is a continuation of Ser. No. 226,015, filed Jan. 19, 1981 (now abandoned).

This particular invention is concerned with an electromagnetic device of a screw/nut type for use in the vertical displacement of, for example, the control rods of a nuclear reactor inside a non-magnetic, impervious cylinder.

Numerous electromagnetic devices of a screw/nut type for allowing the movement of the control bars of a nuclear reactor are known. Such devices are described, for example, in French Pat. Nos. 2,041,128 and 2,320,656. These devices, however, present certain problems, including, for example, certain magnetic materials that must be soldered to nonmagnetic materials; and the motor must generally be oversized to accommodate the dispersion of magnetic field developed by the different active threads; and the nut itself has a tendency to be saturated magnetically, etc.

The goal of this invention is to obviate these problems with a simple and inexpensive device; it accordingly being an object of the invention to provide a new and improved electromagnetic safety device of the screw/nut type that shall not be subject to the above-described problems, and that may be applied to the vertical movement of nuclear control rods and similar applications.

Other and further objects will be explained hereinafter and are more particularly delineated in the appended claims.

In summary, however, from one of the important aspects of the invention, it embraces a device comprised of a stator placed around the top part of a cylinder on the outside, and the following pieces disposed inside the cylinder:

(a) a rotor in the upper part of the cylinder, free in axial translation the length of its shaft which it carries in rotation but which is fixed in translation, and with the shaft extending from the top towards the bottom of the cylinder carrying a hollow threaded rod having a neck at its upper end;

(b) a nut, coordinated with the threaded rod, which is able to slide vertically without turning, in the inside of the cylinder and which supports the control rods of the reactor; and (c) an articulated jaw, one part of which is linked with the rotor and the other with part of the shaft. This combination is assembled so that when the stator is energized, the rotor is drawn to the top, closing the jaw on the neck of the threaded rod. By rotating the magnetic field, a rotation will result in the shaft of the rotor which, in turn, will cause a like rotation of the threaded rod. The effect will be that the simultaneous rotations ensure the vertical sliding (without rotating) of the nut. When the stator is not energized, the jaw will be open and the combination of the threaded rod and the nut (linked with the control rods) will fall to the bottom of the impervious cylinder. The length of the shaft should be designed so that it penetrates the threaded rod when the rod has fallen to the bottom of the impervious cylinder. From this lowered position, the rod may readily easily be raised by activating the stator so as to cause rotation of the rotor, which turns the shaft and then the hollow, threaded rod. When this occurs, the apparatus is designed to keep the jaw open and out of contact with the neck of the threaded rod.

The invention will be better understood, as will other objects, advantages, and characteristics of the invention from the subsequent description, which embraces a preferred embodiment with directions for best mode operation of the invention. The same will now be described with reference to the accompanying drawings, FIG. 1 of which represents a transverse section of an embodiment of the invention designed to ensure the movement of the control rods of a nuclear reactor;

FIGS. 2 and 3 are cross-sectional views taken along the respective lines II—II and III—III of FIG. 1; and FIGS. 4 and 5 are transverse sections similar to FIG. 1, but upon an enlarged scale, and illustrating closed and open jaw positions, respectively.

In reference now to the different figures, the electromagnetic device of a screw/nut type is designed to enable the longitudinal (vertical) displacement of the control rods of the nuclear reactor 2, FIG. 1. A vertically elongated support container or cylinder 3 is constructed of impermeable, nonmagnetic material and the same conditions of temperature and pressure exist in the cylinder 3 and in the reactor 2 therebelow. At the upper exterior of the cylinder 3, a stator is disposed comprising a set of coils 4 designed to generate a transverse magnetic field inside the cylinder 3, this field being capable of rotating, as is well known.

At the upper interior of the cylinder 3, a rotor 5 is disposed for rotation about the axis of the cylinder and is preferably in the form of a flange of magnetic material, as represented in FIG. 2. A shaft 6 supported in the cylinder for rotation about the axis thereof is coupled to the rotor 5 to rotate therewith but is fixed in translation. It extends from near the base of the cylinder 3, to the top of the cylinder. Key pins 7 shown in FIG. 2, ensure the desired connection between the rotor 5 and the shaft 6 and transmit any rotation of the rotor 5 to the shaft 6 when the magnetic field as generated by the stator 4 controls the same.

A hollow threaded rod 8 is supported on the shaft 6 for translation along the shaft and acts as the screw drive of the apparatus. This rod 8 coaxially surrounds the shaft 6 and is of sectional shape that allows the shaft to rotate the rod. In FIG. 3, this sectional shape is represented as a square, though obviously another form could be utilized.

A nut 9, free to slide vertically but without turning in the interior of the cylinder 3, has threads that engage the threads of the threaded screw rod 8 so that the rotation of the rod results in the translation of the nut 9. Pins 10 protrude into slots in the cylinder 3, as shown in FIG. 3, allowing the holding of the nut 9 against rotation. The control rods 1 of the reactor 2 are attached as, for example, by a cylindrical tube 11, FIG. 1, to the nut 9.

An indented section or neck 12 is formed in the upper segment of the hollow threaded rod 8 so that when the hereinafter described locking jaw means 13 is closed or locked to engage the rod 8, FIGS. 1 and 4, the neck 12 will act as a support for the teeth of the jaw 13.

This jaw 13 is comprised of two pivotally interconnected link pieces 14 and 15 which are respectively pinned to the rotor 5 and the shaft 6 for pivotal support in such a way that the teeth of the jaw 13 are inserted into the neck 12 of the threaded rod 8 when the rotor 5 is held in the raised position of FIGS. 1 and 4 by the energized stator 4.

When the stator coils 4 are energized, the rotor 5 is drawn by the stator to the elevated position of FIGS. 1 and 4, which tends to reduce the resistance to the magnetic flux. As this occurs, the lower extremity of the rotor 5 pushes the teeth of the upper link of the jaw 13 into the neck 12 of the threaded rod 8 by downward pivoting action of the lower link 14, moving the jaw 13 to its locked position. The weight of the rod 8, the nut 9, and the control rods 1 is then entirely supported by the rotor 5, which maintains a position of axial equilibrium relative to the amplitude of the magnetic field generated by the stator coils 4.

The magnetic field produced by the stator is caused to rotate like an asynchronous electric motor or a stepping motor, so that the rotor 5 will follow the rotation, carrying the shaft 6 with it. In turn, the shaft 6 will carry the rotation to the threaded rod 8 which causes a translational movement of the nut 9 sliding longitudinally without turning. According to the direction of the rotation, the control rods 1 attached to the nut 9 will thus be raised and lowered smoothly and continuously.

When, however, the control rods 1 must fall rapidly longitudinally into the core of the reactor 2, or when the electric current from the stator coils 4 fails, safety is ensured by the fact that the rotor 5 will fall to its lowest position, since it is no longer held up by field from the stator. The rotor 5 will come to rest on shoulders 16 cut for this function on the shaft 6. The intermediary lower link 14 becomes elevated to cause the upper jaw link 15 to pivot outward to a more vertical position, FIG. 5, and to unclamp the jaw 13 from the neck 12. The jaw is thus moved to its unlocked position and disengaged from the rod 8. The threaded rod 8 thus being no longer held up, falls downward under gravity and as guided by the shaft 6, carrying with it the nut 9 and the control rods 1.

Stops 17 are provided at the bottom interior of the cylinder 3 to retain the nut 9 inside the cylinder and thus enable the eventual re-elevation of the assembly.

This re-elevation is accomplished by re-energizing the stator coils 4 so as to recreate a rotating electric field. The rotor 5 is then drawn to a raised position and transmits the rotation in the appropriate direction to the shaft 6 the length of which is adjusted so that it can still reach the threaded rod 8 when the rod 8 has fallen to the bottom of the cylinder 3. The shaft 6 transmits the rotation to the threaded rod 8. The nut 9 resting on the stops 17 can go no lower and because it engages the threads of the threaded rod 8, it causes the rod 8 to ascend in translation.

The rotor 5 being in raised position, causes the jaw 13 to close as in FIGS. 1 and 4. The upper edge of the threaded rod 8 is bevelled near the neck 12 to re-catch the teeth of the jaw 13 again around the neck 12. At this time, the threaded rod 8 is stopped in its elevation and the nut 9 then begins its elevation if the magnetic field continues to turn, thus ensuring the elevation of the control rods 1.

A sleeve 18 (retaining means) provided with a lower lateral pin 19 slides in an annular chamber formed inside the shaft 6 below the shoulder region 16. The sleeve normally is at a rest position on the upper extremity of the upwardly held threaded rod 8, FIG. 4, and in such position, compresses a spring 20, within the chamber. In the absence of the threaded rod 8, as under release conditions of FIG. 5, the spring 20 pushes the sleeve 18 down the chamber to an operative position at which the pin 19 holds the opened jaw 13 in open (unlocked) position as is represented in FIG. 5. When the threaded rod 8 is re-elevated, the rod will push the sleeve 18 back into the chamber, thus freeing the jaw 13 which can close again on the neck 12 as before described. The sleeve is preferably of substantially the same inner diameter as the threaded rod 8.

Although this is a preferred construction by which the invention may be effectuated, it remains evident that modification by those skilled in this art will not depart from the spirit and scope of this invention. For example, a helicoidal spring 21 may be designed to go between the shaft 6 at a region below the shoulder 16 thereof and the bottom of the rotor 5 near the link part 14, as shown in FIGS. 4 and 5, in order more quickly to neutralize the effect of retained magnetization of the apparatus, as in the case of an accident. Also, it does not matter what type of mechanism is utilized to provide the shaft 6 with only one degree of freedom in rotation and none in translation. The pins 10 of FIG. 3, moreover, designed to stop the rotation of the nut 9, can be omitted if sufficient torque blocking rotation of the screw can be obtained by some other means. Finally, it must be noted that this particular invention has the advantage of needing fewer electric coils than devices currently in existence for similar purposes.

What is claimed is:

1. In a nuclear reactor having a control rod, an electromagnetic safety apparatus for longitudinal displacement of said control rod, said apparatus comprising, in combination, a vertically elongated container, stator means at an upper part of the container for providing a rotating magnetic field in said upper part, rotor means disposed in the container adjacent to the stator means for rotation by the field of the stator means about an axis extending along the length of the container, a shaft extending along the length of the container and supported therein for rotation about said axis, said shaft being coupled to said rotor means for rotation therewith, a hollow threaded rod supported on said shaft for translation along the shaft, said hollow threaded rod being coupled to the shaft for rotation therewith, a nut having threads engaged with the threads of the hollow threaded rod and being supported in the container for translation along the length of the container but held against rotation in the container, said nut supporting said control rod, and locking means movable between a locked position at which the locking means engages an upper part of said hollow threaded rod and holds said hollow threaded rod at an elevated position on said shaft and an unlocked position at which the locking means disengages said hollow threaded rod to permit said hollow threaded rod and said nut to fall toward the bottom of said container, whereby said control rod may be lowered rapidly, said apparatus being characterized in that the rotor means is supported for translation along said shaft and is moved by said field of said stator means in translation in a first direction while it is rotated by said field, and in that said rotor means is coupled to said locking means and actuates said locking means to engage and hold said hollow threaded rod at said elevated position when said rotor means moves in said first direction.

2. Apparatus in accordance with claim 1, wherein said rotor means moves in a direction opposite to said first direction in response to de-energization of said stator means and causes said locking means to disengage said hollow threaded rod.

3. Apparatus in accordance with claim 2, wherein said upper part of said hollow threaded rod has a neck that is engaged by said locking means.

4. Apparatus in accordance with claim 2, wherein said locking means comprises jaw means having a pair of pivotally interconnected links, one of which is pivotally mounted on said shaft and the other of which is pivotally mounted on said rotor means.

5. Apparatus in accordance with claim 1, wherein the length of the shaft is sufficient to ensure that the shaft is coupled to the hollow threaded rod when the hollow threaded rod has fallen to the bottom of the container.

6. In a nuclear reactor having a control rod, an electromagnetic safety apparatus for longitudinal displacement of said control rod, said apparatus comprising, in combination, a vertically elongated container, stator means at an upper part of the container for providing a rotating magnetic field in said upper part, rotor means disposed in the container adjacent to the stator means for rotation by the field of the stator means about an axis extending along the length of the container, a shaft extending along the length of the container and supported therein for rotation about said axis, said shaft being coupled to said rotor means for rotation therewith, a hollow threaded rod supported on said shaft for translation along the shaft, said hollow threaded rod being coupled to the shaft for rotation therewith, a nut having threads engaged with the threads of the hollow threaded rod and being supported in the container for translation along the length of the container but held against rotation in the container, said nut supporting said control rod, and locking means movable between a locked position at which the locking means engages an upper part of said hollow threaded rod and holds said hollow threaded rod at an elevated position on said shaft and an unlocked position at which the locking means disengages said hollow threaded rod to permit said hollow threaded rod and said nut to fall toward the bottom of said container, whereby said control rod may be lowered rapidly, said apparatus being characterized in that the field of the stator means simultaneously drives the rotor means in rotation and actuates said locking means to engage and hold said hollow threaded rod at said elevated position, and in that said apparatus further comprises retaining means for holding said locking means at its unlocked position in response to the disengagement of said hollow threaded rod from said locking means and for permitting said locking means to move to its locked position in response to the raising of said hollow threaded rod to said elevated position.

7. Apparatus in accordance with claim 6, wherein said retaining means is supported on said shaft for movement therealong downward from a rest position to an operative position at which said retaining means holds said locking means at its unlocked position.

8. Apparatus in accordance with claim 7, wherein said retaining means comprises a sleeve coaxial with said shaft and has biasing means urging said sleeve downward toward said operative position, said sleeve having surface means engaging the upper part of said hollow threaded rod when said locking means engages said upper part of said hollow threaded rod, and said sleeve being prevented by said hollow threaded rod from moving to said operative position until said hollow threaded rod is disengaged from said locking means, said sleeve being moved upward by said hollow threaded rod to its rest position, against the bias of said biasing means, when said hollow threaded rod is raised to said elevated position and re-engaged with said locking means.

9. Apparatus in accordance with claim 8, wherein said biasing means comprises a spring.

10. Apparatus in accordance with claim 9, wherein said shaft has a chamber that receives said sleeve.

11. Apparatus in accordance with claim 6, wherein the upper extremity of said hollow threaded rod is bevelled to facilitate engagement of said hollow threaded rod with said locking means when said hollow threaded rod is raised to said elevated position.

* * * * *